(12) United States Patent
Imai

(10) Patent No.: US 8,474,939 B2
(45) Date of Patent: Jul. 2, 2013

(54) PRINTING CONTROL DEVICE AND PRINTING CONTROL PROGRAM

(75) Inventor: Toshie Imai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 13/043,978

(22) Filed: Mar. 9, 2011

(65) Prior Publication Data

US 2011/0242175 A1    Oct. 6, 2011

(30) Foreign Application Priority Data

Apr. 1, 2010   (JP) ................................. 2010-084893

(51) Int. Cl.
*B41J 2/205* (2006.01)

(52) U.S. Cl.
USPC .......................................................... 347/15

(58) Field of Classification Search
None
See application file for complete search history.

(56) References Cited

FOREIGN PATENT DOCUMENTS

JP    2006-168370 A    6/2006

*Primary Examiner* — Stephen Meier
*Assistant Examiner* — Tracey McMillion
(74) *Attorney, Agent, or Firm* — Global IP Counselors, LLP

(57) ABSTRACT

The information expressed by an original color image can be visually recognized even if the recording medium on which the color image has been recorded in dye ink is wetted with water. With a printing device equipped with pigment ink and dye ink, in the printing of a color image, the pigment ink corresponding to an image characteristic amount included in the color image is also injected along with the dye ink, so an image expressing the image characteristic amount included in the color image is recorded with the pigment ink, which has excellent water resistance, over the color image printed with the dye ink on the printing medium. Accordingly, in the event that the recording medium becomes wet and the dye ink bleed, the user can still make out the content of the information expressed by the original color image from the image printed in the pigment ink.

7 Claims, 5 Drawing Sheets

PRINTING CONTROL DEVICE AND PRINTING CONTROL PROGRAM

CROSS-REFERENCE TO RELATED APPLICATIONS

This application claims priority to Japanese Patent Application No. 2010-084893 filed on Apr. 1, 2010. The entire disclosure of Japanese Patent Application No. 2010-084893 is hereby incorporated herein by reference.

BACKGROUND

1. Technical Field

The present invention relates to a printing control technique with which the information expressed by the original color image can be preserved on the recording medium in a state of being visually recognizable even if the color image recorded with dye ink on the recording medium should bleed.

2. Related Art

The inkjet recording device of Japanese Laid-Open Patent Application Publication No. 2006-168370, for example, is a known color inkjet printer equipped with both pigment ink and dye ink.

This inkjet recording device is equipped with dye ink as its color ink, and with both dye ink and pigment ink as its black ink. Printing using the black ink of both the dye ink and the pigment ink is only performed when recording a monochromatic image on plain paper having no absorbent layer, and in other cases (such as when recording a monochromatic image or color image on special paper having an absorbent layer, or when recording a color image on plain paper) printing is performed using dye ink for both color image and black ink. Consequently, on special paper a good monochromatic image and a good color image can be recorded, and on plain paper a good color image can be recorded, and a sharp monochromatic image with high density can be quickly recorded.

SUMMARY

With the conventional inkjet recording device discussed above, however, dye ink, whose water resistance is inferior to that of pigment ink, is generally used for both black and color ink, except when recording a monochromatic image on plain paper. Accordingly, if the plain paper or the like on which a color image has been printed with this inkjet recording device should get wet with water, the dye ink will bleed, and the information expressed by the characters and so forth included in the color image may be completely lost.

In view of this, it is an object of the present invention to be able to preserve information expressed by an original color image on a recording medium in a state of being visually recognizable, even if the recording medium on which a color image has been recorded with dye ink should get wet with water.

To solve the stated problem, a printing control device pertaining to one aspect of the present invention is a printing control device for controlling a printing mechanism equipped with pigment ink and a plurality of colors of dye ink to record a color image expressed by image data. The printing control device includes an image processing unit configured to determine an injection amount of dye ink injected for each of the colors with respect to positions of pixels that make up the color image, based on color information included in the image data, and to send the injection amount of the dye ink to the printing mechanism. The image processing unit is configured to calculate an image characteristic amount included in the color image based on the color information for each of the pixels that make up the color image, to determine an injection amount of pigment ink to be injected along with the dye ink at the pixel positions based on the image characteristic amount, and to send the injection amount of the pigment ink along with the injection amount of the dye ink of each of the colors to the printing mechanism.

With this printing control device, at the printing mechanism pigment ink is injected according to the image characteristic amount included in the color image along with the dye ink used to record the color image, so an image expressing the image characteristic amount included in the color image is recorded with pigment ink, which has excellent water resistance, over the color image printed with dye ink on the recording medium. Accordingly, in the event that the recording medium should get wet and the dye ink bleed, the user can still visually ascertain the content of the information expressed by the original color image from the image recorded with pigment ink.

In a preferred embodiment, the image processing unit is configured to calculate brightness as the image characteristic amount for each of the pixels that make up the color image, and to determine the injection amount of the pigment ink with respect to the positions of the pixels according to the brightness.

Consequently, a grayscale image expressing the brightness distribution in the color image recorded with dye ink is recorded with pigment ink over this color image. Accordingly, even if the dye ink should bleed, the user can still ascertain the shape, etc., of the image included in the original color image from the grayscale image recorded with the highly water resistant pigment ink.

In a preferred embodiment, the image processing unit is configured to calculate an edge amount, which expresses a slope of brightness, as the image characteristic amount for each of the pixels that make up the color image, and to determine the injection amount of the pigment ink with respect to the pixel positions based on the edge amount.

Consequently, the pigment ink is prevented from being injected into regions other than the silhouette of the image included in the color image, so a color image with a good hue that is substantially the same as that of the original color image with no superposed water-resistant image can be reproduced on the recording medium.

With the present invention, an image that allows the content of the image expressed by a color image printed with dye ink to be visually recognized is recorded with pigment ink, which has excellent water resistance, over this color image. Accordingly, even if the recording medium should get wet with water and the dye ink bleed, the user can still visually ascertain the content of the information expressed by the original color image from the image recorded with pigment ink.

BRIEF DESCRIPTION OF THE DRAWINGS

Referring now to the attached drawings which form a part of this original disclosure.

DETAILED DESCRIPTION OF EXEMPLARY EMBODIMENTS

An embodiment pertaining to the present invention will now be described through reference to the appended drawings.

First, the configuration of an image recording system pertaining to this embodiment will be described.

Figure 1:
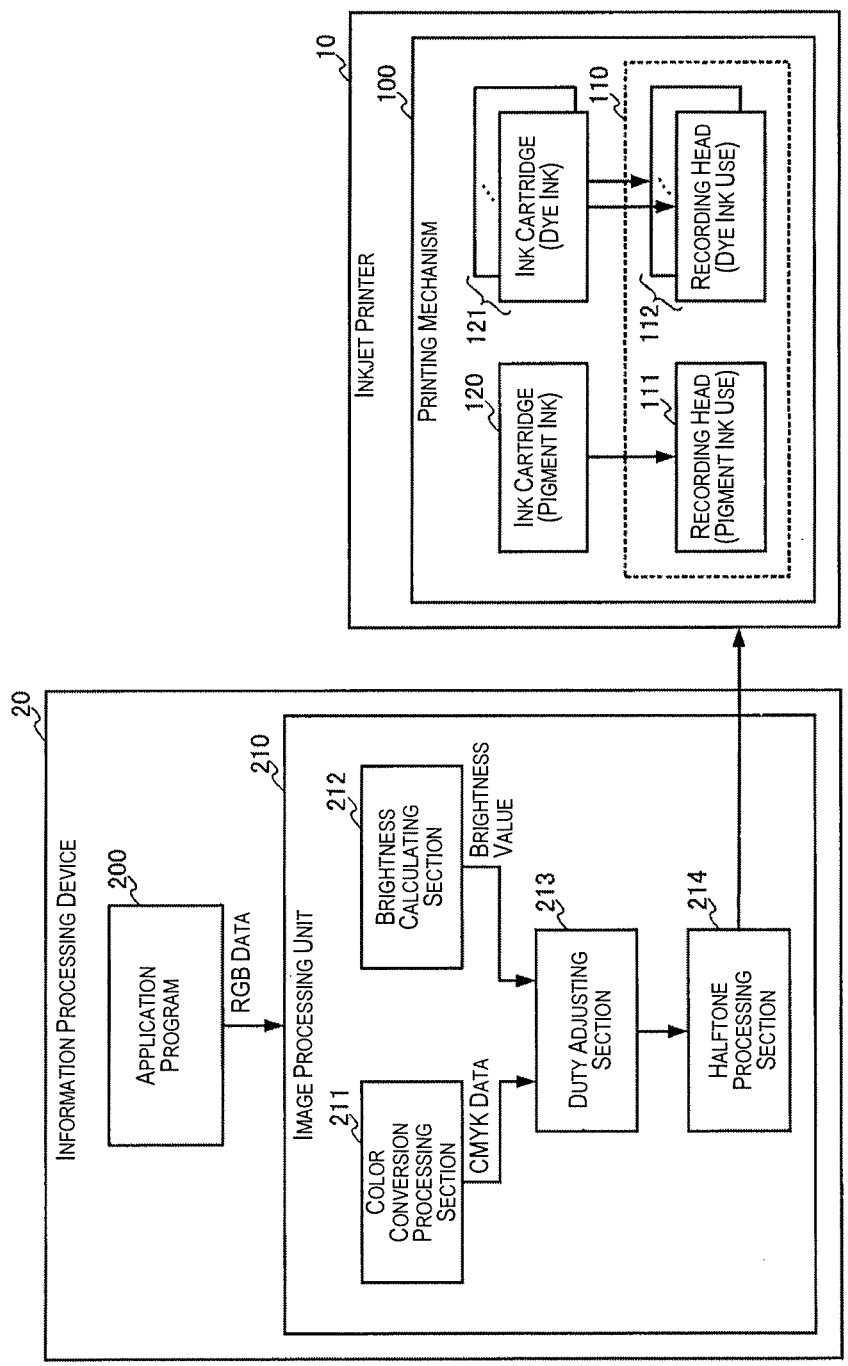
FIG. 1 is a simplified diagram of the configuration of an image recording system pertaining to an embodiment of the present invention.

FIG. 1 is a simplified diagram of the configuration of the image recording system pertaining to this embodiment.

As shown in FIG. 1, the image recording system pertaining to this embodiment includes an information processing device 20 and an inkjet printer 10 that prints a recording medium (recording paper, etc.) with a color image expressed by image data from the information processing device 20.

The inkjet printer 10 has a head unit 110 having a plurality of recording heads 111 and 112, and an inkjet printing mechanism 100 that sprays ink from the recording heads 111 and 112 toward the recording medium. More specifically, the inkjet printer 10 has a carriage on which the head unit 110 is installed, a head movement mechanism for moving the carriage back and forth in the main scanning direction, a recording medium conveyance mechanism for intermittently conveying the recording medium in a direction that intersects the main scanning direction (a sub scanning direction), and so forth. The recording heads 111 and 112 are each provided with a nozzle plate in which a plurality of nozzles are formed along the sub scanning direction, and ink from ink cartridges 120 and 121 mounted according to the recording heads 111 and 112 is discharged from the nozzles of the recording heads 111 and 112. In this embodiment, the ink cartridge 120 is filled with black (K) pigment ink that has better water resistance than a dye ink, and the ink cartridge 121 is filled with various colors of dye ink, such as cyan (C), magenta (M), yellow (Y), and black (K).

Meanwhile, the information processing device 20 has a hardware configuration (a CPU, a memory, a hard disk, and an output interface to which the inkjet printer 10 is connected) serving as a computer in which the CPU loads programs from the hard disk into the memory and executes them. By executing installed printing control programs, this information processing device 20 has the function of executing water-resistant image print processing in which a superposed image comprising a color image expressed by the output image data from an application program and a water-resistant image that expresses the characteristic amount of this color image is recorded with both dye ink and pigment ink. More specifically, this function is performed by an image processing unit 210 that includes a color conversion processing section 211, a brightness calculating section 212, a duty adjusting section 213, and a halftone processing section 214.

Next, the printing control processing executed by the information processing device 20 having the function discussed above will be described. Here, we will assume that either normal mode or water-resistant mode has been preset as the print mode.

Figure 2:
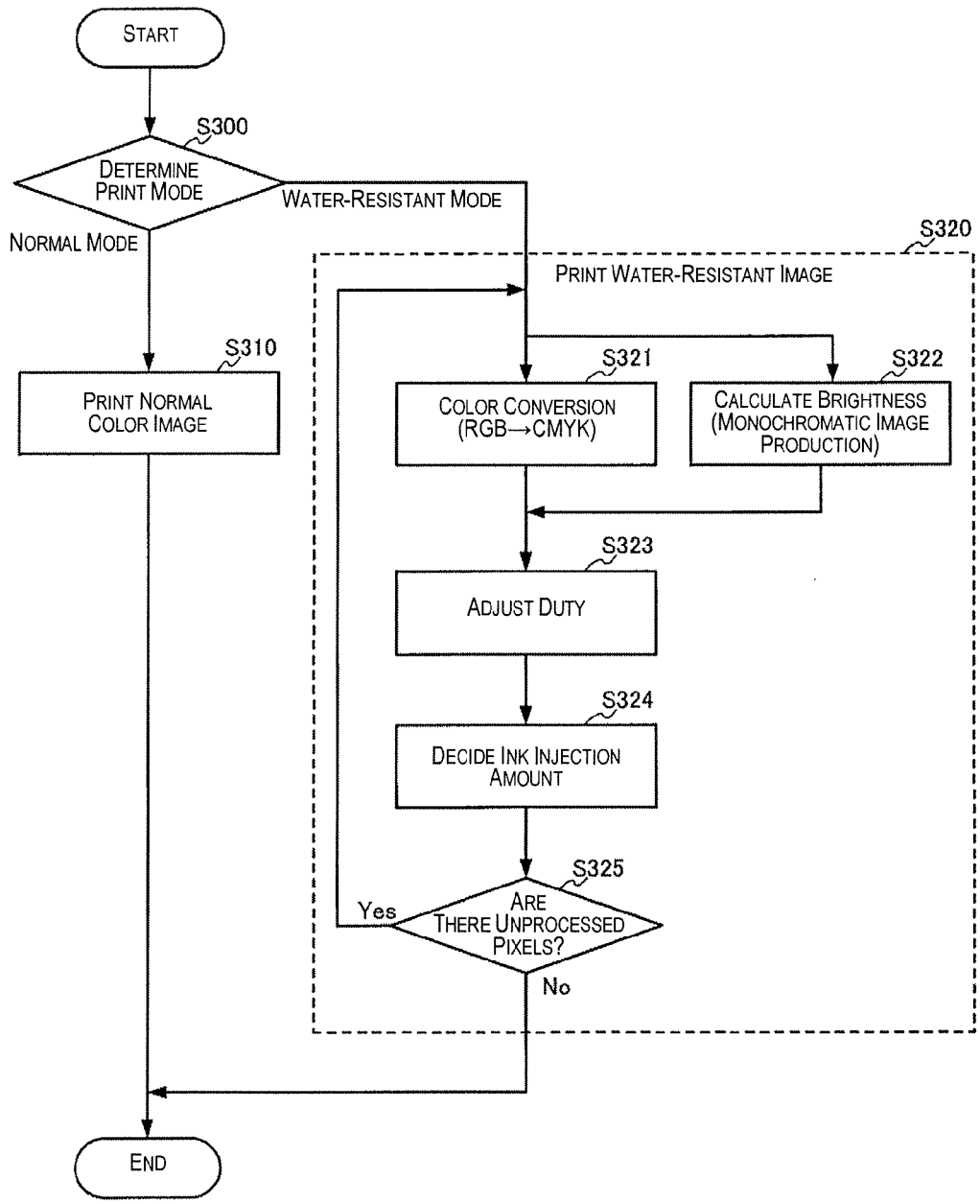
FIG. 2 is a flowchart of printing control processing that includes water-resistant image print processing pertaining to a first embodiment of the present invention.

FIG. 2 is a flowchart of printing control processing that includes water-resistant image print processing pertaining to this embodiment.

Upon receiving from the application program 200 a print request that includes image data expressed by halftone values for the various colors of red (R), green (G), and blue (B), the image processing unit 210 first stores this image data in a buffer memory, and executes the following processing according to the print mode.

If "normal mode" has been set as the print mode (S300: normal mode), the image processing unit 210 executes normal color image print processing (S310), and halftone data that determines whether or not to discharge the dye ink of various colors is inputted to the inkjet printer 10. Consequently, with the inkjet printer 10, a color image expressed by the image data is printed on the recording medium with just dye ink.

On the other hand, if "water-resistant mode" has been set as the print mode (S300: water-resistant mode), the image processing unit 210 executes the following water-resistant image processing (S320), and a superposed image comprising a color image expressed by the image data and a water-resistant image that expresses the characteristic amount of this color image is recorded with both dye ink and pigment ink.

In the water-resistant image processing (S320), the image processing unit 210 executes the following image processing (S321 to S324), successively using the pixels that make up the color image as target pixels.

The color conversion processing section 211 refers to a look-up table for color conversion, and converts the RGB data of the target pixels into halftone values (CMYK data for the various color components corresponding to the dye ink installed in the inkjet printer 10 (S321). Consequently, CMYK data is obtained that expresses the amount of dye ink of each color to be injected with respect to the positions of the target pixels.

Meanwhile, the brightness calculating section 212 uses the following conversion formula (1) to convert the RGB data of the target pixels into a 256-step brightness value Y going from 0 to 255. This yields a brightness value Y that expresses the amount of black pigment ink to be injected along with the dye ink of various colors with respect to the positions of the target pixels.

$$Y = \alpha \times R + \beta \times G + \gamma \times B \tag{1}$$

Where α, β, and γ are weighting coefficients set so as to obtain a specific ratio. For example, α=0.1, β=0.3, and γ=0.6.

Here, the brightness value Y is calculated from the above conversion formula (1), but a look-up table in which RGB data is associated with brightness values Y may be prepared ahead of time, and brightness values Y associated with the RGB data of the target pixels obtained from this look-up table.

After this, the duty adjusting section 213 adjusts the CMYK data for each color and the brightness value Y for the target pixels so that the total amount of black pigment ink and the dye ink of various colors injected per unit of surface of the recording medium will be below the limit set according to the type of recording medium, etc. (S323). The halftone processing section 214 then performs halftone processing based on the adjusted brightness value Y and the adjusted CMYK data, and calculates halftone data that determines whether or not to inject black pigment ink to the target pixels, and halftone data that determines whether or not to inject dye ink of the various colors to the target pixels (S324).

Once halftone data that determines whether or not to inject black pigment ink and halftone data that determines whether or not to inject dye ink have thus been obtained for all of the pixels that make up the color image (No in S325), the image processing unit 210 outputs this halftone data to the inkjet printer 10.

The inkjet printer 10 uses this halftone data to inject dye ink according to the color components of the pixels that make up the color image and pigment ink in an amount corresponding to the brightness value of the pixels (the color image characteristic amount) at the positions of the various pixels, so a superposed image comprising a color image expressed by image data (dye ink image) and a grayscale image expressed by the characteristic amount (brightness distribution) of this color image (pigment ink image) is recorded on the recording medium. Accordingly, even in the event that the recording medium should get wet with water and the dye ink bleed, the user can still ascertain features such as the shape of the image included in the original color image from the grayscale image recorded with pigment ink, which has excellent water resistance. Therefore, the user can visually ascertain the content of the information expressed by the original color image.

In this embodiment, the grayscale image is recorded with black pigment ink, but if pigment ink of other colors is installed in the inkjet printer 10, then the grayscale image may be recorded with pigment ink of other colors.

Also, in this embodiment, a color image is recorded with a plurality of dye inks including dye ink of the same color as the pigment ink used for the grayscale image, but a color image from which the color component that is the same color as the pigment ink used for the grayscale image has been removed may be recorded with just dye ink of a different color from the pigment ink used for the grayscale image.

A grayscale image of the entire color image is printed above as the water-resistant image expressing the color image characteristic amount, but as long as it is an image that allows the user to visually identify the color image characteristic amount, some image other than a grayscale image of the entire color image may be printed as the water-resistant image. For example, if just the edges of the color image are printed as the water-resistant image, injection of the pigment ink to regions other than that of the edge image will be prevented, so a color image of substantially the same hue as an ordinary color image with no superposed water-resistant image (a color image printed with just dye ink by an ordinary color image printing process S310) can be reproduced on the recording medium. A case in which this is done will be described below.

Figure 3:
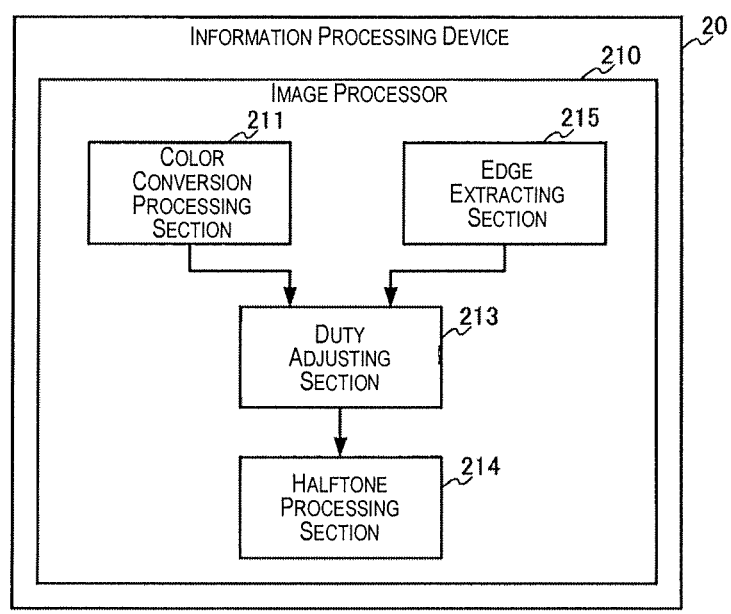
FIG. 3 is a diagram of the functional configuration of an information processing device pertaining to a second embodiment of the present invention.
Figure 4A:
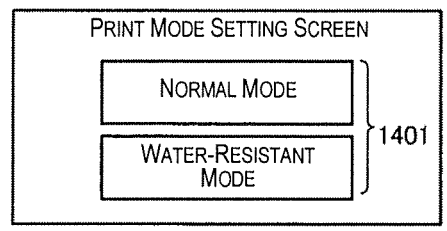
FIG. 4 shows examples of the layout on a print mode setting screen and a water-resistant image setting screen.
Figure 4B:
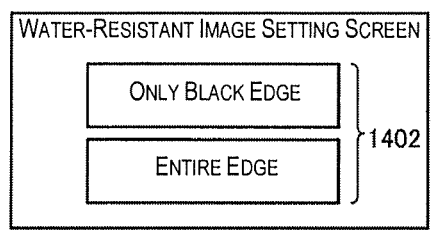
Figure 4C:
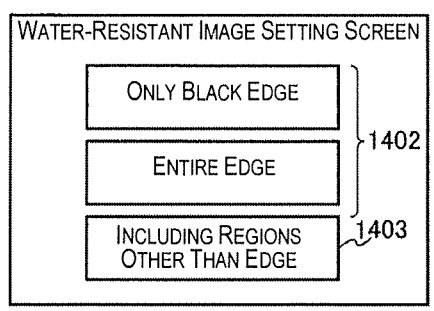

FIG. 3 shows the functional configuration of the information processing device 20 (image processing unit 210) when printing a superposed image comprising a color image expressed by image data and an edge image (water-resistant image) included in this color image. FIGS. 4A and 4B shows examples of a print mode setting screen on which the print mode is selected, and a water-resistant image setting screen on which the production source for a water-resistant image is selected.

In this case, the image processing unit 210 has the color conversion processing section 211, an edge extracting section 215, the duty adjusting section 213, and the halftone processing section 214, and executes normal color image print processing or water-resistant image print processing according to the setting on the displayed setting screen. The setting screen displayed on the display here includes a print mode setting screen with which the user selects either normal print mode or water-resistant print mode (FIG. 4A), and a water-resistant image setting screen with which the type of water-resistant image is selected when the water-resistant mode is selected as the print mode (FIG. 4B). In this embodiment, a button 1402, for selecting an edge image that is either just a black edge or the entire edge (the edge not limited to the color black) as the water-resistant image, is disposed on the water-resistant image setting screen.

Figure 5:
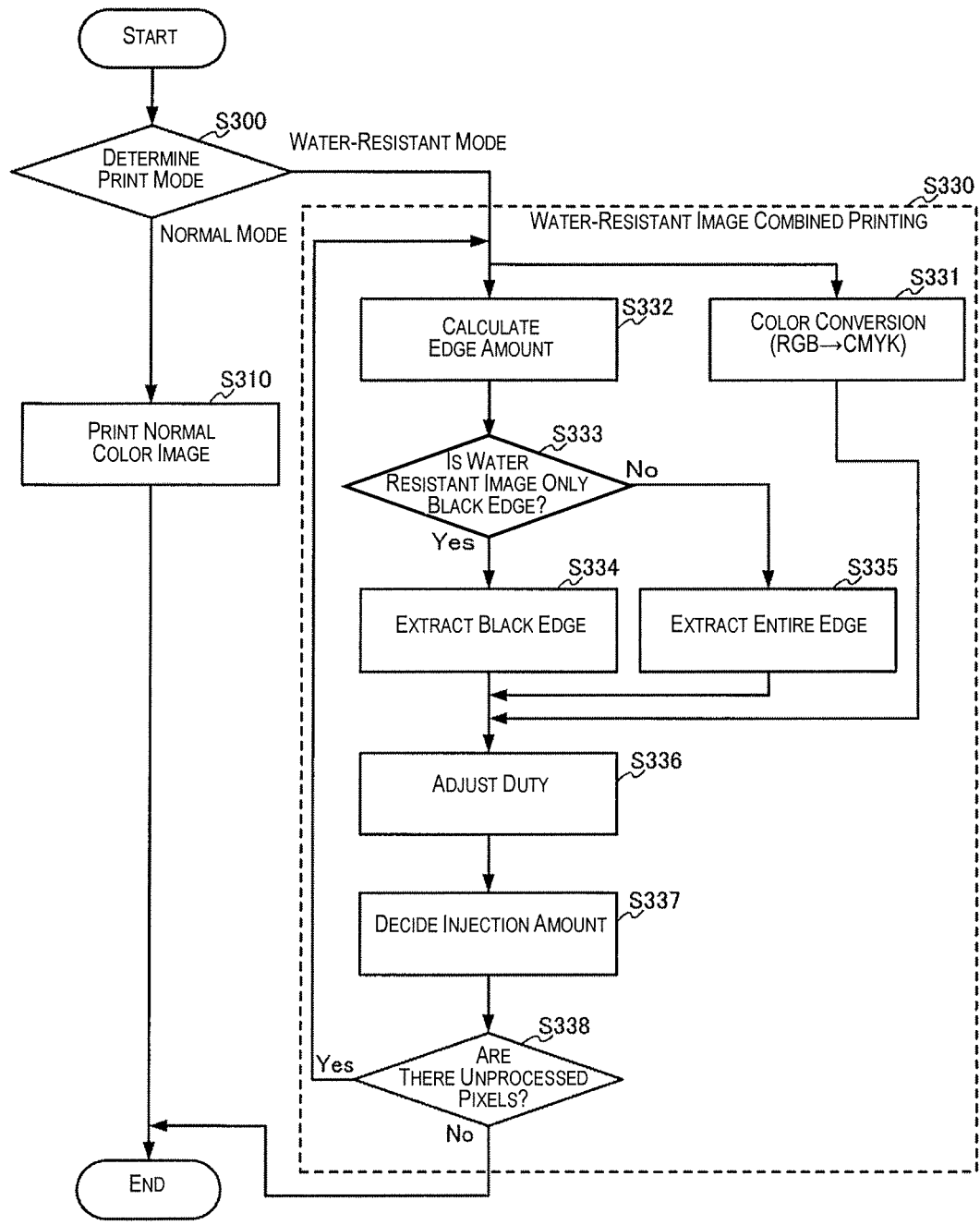
FIG. 5 is a flowchart of printing control processing that includes water-resistant image print processing pertaining to a second embodiment of the present invention.

FIG. 5 is a flowchart of the printing control processing executed by this image processing unit 210.

When the water-resistant mode is selected on the print mode setting screen, and the type of water-resistant image is selected on the water-resistant image setting screen, the image processing unit 210 executes the following water-resistant image combined print processing (S330) instead of the water-resistant image combined print processing in FIG. 2 (S320).

In this water-resistant image print processing (S330), the image processing unit 210 executes the following print processing (S331 to S338) using the pixels that make up the color image as the successive target pixels.

The color conversion processing section 211 converts the RGB data of the target pixels into halftone data (CMYK data) of various colors corresponding to the dye ink installed in the inkjet printer 10 (S331). This gives CMYK data that expresses the amount of dye ink of each color to be injected with respect to the positions of the target pixels.

Meanwhile, the edge extracting section 215 converts the RGB data of the target pixels into a brightness value Y according to the conversion formula (1) given above, and calculates the edge amount of the target pixels (a characteristic amount expressing the slope of the brightness) from the brightness value Y of the target pixels and the brightness value Y of the surrounding pixels by means of an edge extraction filter that has been weighted with a weighting coefficient (S332). Here, the edge amount of the target pixels is calculated from the brightness value, but the edge amount of the target pixels may instead be calculated from the saturation.

When all of the edge image has been set as the water-resistant image (No in S333), the edge extracting section 215 refers to a specific look-up table and determines the value corresponding to the amount of black pigment ink injected, based on the edge amount (S335). For instance, the value corresponding to the amount of black pigment ink injected may be set to "0" if the edge amount of the target pixels is at or over a specific threshold, and to "255" if the edge amount is less than the specific threshold.

When just the black edge image has been set as the water-resistant image (Yes in S333), the edge extracting section 215 refers to a specific look-up table and determines the value corresponding to the amount of black pigment ink injected, with respect to the target pixels that are the black edge, based on the RGB data and the edge amount of the target pixels (S334). For instance, the value corresponding to the amount of black pigment ink injected may be set to "0" if the color of the target pixels is black and the edge amount thereof is at or over a specific threshold, and to "255" if the edge amount is less than the specific threshold.

After this, the duty adjusting section 213 adjusts the CMYK data for each color and for the new brightness value set for the target pixels so that the total amount of black pigment ink and the dye ink for the various colors to be injected per unit of surface area of the recording medium will be at or under a limit determined according to the type of recording medium, etc. (S336). The halftone processing section 214 then subjects the adjusted brightness value and the adjusted CMYK data to halftone processing, and thereby calculates halftone data that determines whether or not to discharge black pigment ink to the target pixels, and halftone data that determines whether or not to discharge dye ink of the various colors to the target pixels (S337).

Once halftone data that determines whether or not to inject black pigment ink and halftone data that determines whether or not to inject dye ink of the various colors have thus been obtained for all of the pixels that make up the color image (No in S338), the image processing unit 210 outputs this halftone data to the inkjet printer 10.

Consequently, pigment ink is injected at the position of pixels having at least a specific edge amount (the color image characteristic amount) (that is, at the edge included in the color image printed with dye ink), so a superposed image comprising a color image (a dye ink image) and all the edge image (pigment ink image) that is black or includes black included in this color image is recorded on the recording medium. Accordingly, even in the event that the recording medium should get wet with water and the dye ink bleed, the user can still recognize the edge images recorded with the pigment ink, which has excellent water resistance. These edge images include, for example, the edges of letters, the outline of the subject included in a photographic image or the like (such as the outline of a face), or the like, so these images remain even if the dye ink should bleed into water.

With this embodiment, an edge image of the entire edge or just the black edge included in the color image is recorded with black pigment ink, but if pigment ink of other colors is installed in the inkjet printer 10, then the edge image of letters, or black letters, included in the color image may be recorded with pigment ink of other colors.

Also, in this embodiment, an edge image of a black edge or the entire edge is printed as the water-resistant image, but an image other than of the edge may be printed as the water-resistant image. In this case, as shown in FIG. 4D, for example, a button 1403 for selecting that an image of an image region will be included in the water-resistant image and printed along with an edge image of either a black edge or the entire edge, may be disposed on the water-resistant image setting screen in addition to the above-mentioned button 1402. For example, when a face is automatically detected out of an image, the image within the facial region may be printed as a mixture with black pigment ink according to the brightness.

An example was given above of application to an image recording system including the inkjet printer 10 equipped with both dye ink and pigment ink, and the information processing device 20, but the present invention can also be applied to any other device having an inkjet type of image recording function. For example, when the application is to a device that takes in image data by scanning the original (such as a copier or a decoder), the various processing included in the printing control processing discussed above may be executed by an ASIC or the like inside the device. However, the brightness values Y or the edge amounts may be successively calculated during scanning or the original, or may be calculated from image data stored in a buffer memory after completion of scanning of the original.

Also, in the above embodiment, an example was described in which the inkjet printer had four colors (C, M, Y, and K), but an inkjet printer having colors other than these can also be used (such as one having a total of six or eight colors).

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing control device for controlling a printing mechanism equipped with pigment ink and a plurality of colors of dye ink to record a color image expressed by image data, the printing control device comprising:

an image processing unit configured to determine an injection amount of dye ink injected for each of the colors with respect to positions of pixels that make up the color image, based on color information included in the image data, and to send the injection amount of the dye ink to the printing mechanism, the image processing unit being configured to calculate an image characteristic amount included in the color image based on the color information for each of the pixels that make up the color image, to determine an injection amount of pigment ink to be injected along with the dye ink at the pixel positions based on the image characteristic amount, and to send the injection amount of the pigment ink along with the injection amount of the dye ink of each of the colors to the printing mechanism.

2. The printing control device according to claim 1, wherein the image processing unit is configured to calculate brightness as the image characteristic amount for each of the pixels that make up the color image, and to determine the injection amount of the pigment ink with respect to the positions of the pixels according to the brightness.

3. The printing control device according to claim 1, wherein the image processing unit is configured to calculate an edge amount, which expresses a slope of brightness, as the image characteristic amount for each of the pixels that make up the color image, and to determine the injection amount of the pigment ink with respect to the pixel positions based on the edge amount.

4. The printing control device according to claim 1, further comprising a print mode setting reception unit configured to receive a setting of print mode, the image processing unit being configured to send the injection amount of the dye ink for each of the colors with respect to the positions of the pixels that make up the color image to the printing mechanism when the print mode setting reception unit has received the setting of a first print mode as the print mode, and send the injection amount of the pigment ink along with the injection amount of the dye ink for each of the colors with respect to the positions of the pixels that make up the color image to the printing mechanism when the print mode setting reception unit has received the setting of a second print mode as the print mode.

5. A non-transitory computer readable medium having stored thereon a printing control program which is executable by a computer to control a printing mechanism equipped with pigment ink and a plurality of colors of dye ink to record a color image expressed by image data, the printing control program controls the computer to execute function of:
  determining an injection amount of the dye ink of each of the colors with respect to positions of a plurality of pixels that make up the color image based on color information included in the image data;
  calculating an image characteristic amount included in the color image based on the color information for each of the pixels that make up the color image, and determining an injection amount of the pigment ink to be injected along with the dye ink at the pixel positions based on the image characteristic amount; and
  sending the injection amount of the pigment ink to be injected along with the dye ink, along with the injection amount of the dye ink of each of the colors with respect to the positions of the pixels that make up the color image to the printing mechanism.

6. A printing control method for controlling a printing mechanism equipped with pigment ink and a plurality of colors of dye ink to record a color image expressed by image data, the printing control method comprising:
  determining an injection amount of dye ink injected for each of the colors with respect to positions of pixels that make up the color image, based on color information included in the image data, and sending the injection amount of the dye ink to the printing mechanism; and
  calculating an image characteristic amount included in the color image based on the color information for each of the pixels that make up the color image, to determine an injection amount of pigment ink to be injected along with the dye ink at the pixel positions based on the image characteristic amount, and sending the injection amount of the pigment ink along with the injection amount of the dye ink of each of the colors to the printing mechanism.

7. The printing control method according to claim 6, further comprising
  receiving a setting of print mode by a printing mode setting reception unit,
  the sending of the injection amount of the dye ink including sending the injection amount of the dye ink for each of the colors with respect to the positions of the pixels that make up the color image to the printing mechanism when the print mode setting reception unit has received the setting of a first print mode as the print mode, and
  the sending of the injection amount of the pigment ink including sending the injection amount of the pigment ink along with the injection amount of the dye ink for each of the colors with respect to the positions of the pixels that make up the color image to the printing mechanism when the print mode setting reception unit has received the setting of a second print mode as the print mode.

* * * * *